(12) United States Patent
Durairaj et al.

(10) Patent No.: US 12,135,995 B2
(45) Date of Patent: Nov. 5, 2024

(54) DISTRIBUTED EDGE COMPUTING PLATFORM FOR VEHICLES

(71) Applicant: The Boeing Company, Chicago, IL (US)

(72) Inventors: Surya Sundar Raj Durairaj, Bangalore (IN); Alyssa M. De Leon, Bellevue, WA (US); Arun Ojha, Seattle, WA (US); Rodolfo A. Santiago, Bellevue, WA (US); Sangeeta S. Patro, Bangalore (IN)

(73) Assignee: The Boeing Company, Arlington, VA (US)

( * ) Notice: Subject to any disclaimer, the term of this patent is extended or adjusted under 35 U.S.C. 154(b) by 356 days.

(21) Appl. No.: 17/674,442

(22) Filed: Feb. 17, 2022

(65) Prior Publication Data

US 2022/0326998 A1    Oct. 13, 2022

Related U.S. Application Data

(60) Provisional application No. 63/172,391, filed on Apr. 8, 2021.

(51) Int. Cl.
*G06F 9/50* (2006.01)
(52) U.S. Cl.
CPC .................... *G06F 9/5027* (2013.01)
(58) Field of Classification Search
CPC .................................................... G06F 9/5027
See application file for complete search history.

(56) References Cited

U.S. PATENT DOCUMENTS 10,423,459 B1   9/2019  Jacques de Kadt et al.
10,769,030 B2*  9/2020  Chopra ............... G06F 11/1464

OTHER PUBLICATIONS

Canadian Intellectual Property Office, Office Action and Search Report Issued in Application No. 3,149,986, Feb. 16, 2024, 5 pages.
Extended European Search Report issued Jul. 29, 2022, in corresponding European application No. 22163391.0.

(Continued)

*Primary Examiner* — Charlie Sun
(74) *Attorney, Agent, or Firm* — Alleman Hall & Tuttle LLP

(57) ABSTRACT

A method for managing computing resources on a vehicle with line-replaceable units (LRUs) including respective allocated system resources for tasks the LRUs are designed to perform and respective unallocated system resources that are available is provided. Implementations of the method include identifying the LRUs and applying a middleware layer across the LRUs to establish an edge computing infrastructure in which the LRUs operate as edge nodes. The middleware layer receives information from the edge nodes identifying the unallocated system resources and identifies data sources onboard the vehicle, data provided by those sources, and tasks to be performed using the data. The middleware further determines expected operational performance of the edge computing infrastructure and distributes the tasks to be performed across the edge nodes based on the expected operational performance of the edge computing infrastructure.

21 Claims, 4 Drawing Sheets

(56) References Cited

OTHER PUBLICATIONS

Bolettieri Simone et al: "Edge-Assisted Resource Management for Data-Centric IoT Applications in Shared Sensor Networks," 2020 IEEE 21$^{st}$ International Symposium on "A World of Wireless, Mobile and Multimedia Networks" (WOWMOM), IEEE, Aug. 31, 2020, pp. 137-146, XP033838660.
European Patent Office, Office Action Issued in Application No. 22163391.0, Jul. 8, 2024, 7 pages.

\* cited by examiner

DISTRIBUTED EDGE COMPUTING PLATFORM FOR VEHICLES

CROSS-REFERENCE TO RELATED APPLICATION(S)

This application claims priority to U.S. Provisional Patent Application No. 63/172,391, filed Apr. 8, 2021, entitled Distributed Edge Computing Platform for Vehicles, the content of which is incorporated herein by reference in its entirety.

TECHNOLOGICAL FIELD

The present disclosure relates generally to managing computing resources on a vehicle and, in particular, to efficiently distributing tasks among otherwise unallocated system resources.

BACKGROUND

Modern vehicles have become increasingly fitted with sensors, telemetry, avionic, and other components that monitor, assist, and improve the safety, reliability, and function of such vehicles. As the quantity and sophistication of such components have increased, so too has the quantity of data produced by such components. Consequently, in many situations, the computational load associated with processing such large quantities of data approaches or exceeds the capabilities of traditional vehicle-based computing architectures. For example, a modern, single twin-engine aircraft may be fitted with five thousand sensors that generate a combined ten gigabytes of data per second, or approximately 844 terabytes of data over a twelve-hour flight time. Since one of the core purposes underlying the addition of sensors and other data-generating components to vehicles is to enhance the safety of such vehicles while in motion, it remains important for vehicle-based computing resources to capture and process data quickly.

Therefore it would be desirable to have a system and method that takes into account at least some of the issues discussed above, as well as other possible issues.

BRIEF SUMMARY

Example implementations of the present disclosure are directed to efficiently distributing computing tasks across otherwise unallocated computing resources on a vehicle. Modern vehicles, such as modern aircraft, ships, busses, trucks, and cars, may be fitted with numerous sensors and other components that generate large volumes of data that impose a large computational burden on centralized computing resources. Such large volumes of data raise multiple technical challenges that are unmet by the conventional approaches to data processing used on vehicles. As a result, real time or near-real time analysis of the data is largely unavailable, and is otherwise limited by the processing constraints of a central server that may perform some data processing in addition to managing the flow of data off of the vehicle to one or more external systems.

To overcome these and other technical challenges, example implementations of the present disclosure leverage unallocated system resources that may be available at any of a number of line-replaceable units (LRUs) that are present on the vehicle. On a vehicle, sensors, avionic equipment, and other systems may be implemented as LRUs that include system resources that are allocated for the task or tasks that the given LRU is designed to perform. For example, an LRU associated with a sensor may include system resources allocated to read, condition, sample, or otherwise process the signal produced by the sensor. In another example, an LRU may include system resources allocated to facilitate the transmission of media or other content to the passengers. In another example, an LRU may include allocated resources to capture, record, and/or transmit avionic information. Regardless of the precise design or purpose of a given LRU, each LRU may have additional, system resources that are unallocated during the normal operation of the LRU. For example, an LRU may have a more powerful or faster processor than necessary to handle the computational load imposed by its normal tasks, more memory than necessary to capture the required data, or may have other resources that are unallocated during its normal operation.

Example implementations of the present disclosure use the unallocated system resources by applying a middleware layer from a central server to one or more LRUs to establish an edge computing infrastructure, where the LRUs are operable as edge nodes. The middleware layer then uses information about the unallocated resources, the data and data sources on the vehicle, the tasks to be performed on the data and the expected operational performance of the edge nodes to distribute tasks to the edge nodes, where the previously unallocated system resources are used to perform the assigned task or tasks.

The present disclosure thus includes, without limitation, the following example implementations.

Some example implementations provide a method for managing computing resources on a vehicle equipped with line-replaceable units (LRUs) including respective allocated system resources for tasks the LRUs are designed to perform, and respective unallocated system resources that are available, the method comprising: identifying the LRUs; applying a middleware layer across the LRUs to establish an edge computing infrastructure in which the LRUs are operable as edge nodes; and via the middleware layer, receiving information from the edge nodes that identifies the respective unallocated system resources; identifying data sources onboard the vehicle, data provided by the data sources, and tasks to be performed using the data, the tasks to be performed excluding the tasks the LRUs are designed to perform; determining expected operational performance of the edge computing infrastructure based on the respective unallocated system resources, the data sources, the data, and the tasks to be performed; and distributing the tasks to be performed across the edge nodes at which at least a portion of the respective unallocated system resources are allocated to the tasks, based on the expected operational performance of the edge computing infrastructure, the portion of the respective unallocated system resources thereby constituting respective allocated system resources for the tasks to be performed.

In some example implementations of the method of any preceding example implementation, or any combination of any preceding example implementations, identifying the data sources includes identifying sensors onboard the vehicle, and the data provided by the sensors includes environmental conditions measurable by the sensors.

In some example implementations of the method of any preceding example implementation, or any combination of any preceding example implementations, the vehicle is an aircraft, and identifying the sensors includes identifying avionic systems onboard the aircraft.

In some example implementations of the method of any preceding example implementation, or any combination of any preceding example implementations, determining the expected operational performance of the edge node computing infrastructure comprises determining transfer times of the data from the data sources to the edge nodes.

In some example implementations of the method of any preceding example implementation, or any combination of any preceding example implementations, determining the expected operational performance of the edge node computing infrastructure comprises determining response times of the respective unallocated system resources of the edge nodes to perform the tasks using the data.

In some example implementations of the method of any preceding example implementation, or any combination of any preceding example implementations, the method further comprises via the middleware layer: measuring an actual operational performance of the edge node computing infrastructure as the tasks to be performed are performed; and redistributing one or more of the tasks to be performed across the edge nodes based on the actual operational performance of the edge node computing infrastructure.

In some example implementations of the method of any preceding example implementation, or any combination of any preceding example implementations, the method further comprises via the middleware layer: distributing an operational policy of the edge computing infrastructure to the edge nodes, the operational policy setting a condition or constraint on performance of the tasks to be performed.

Some example implementations provide an apparatus for managing computing resources on a vehicle equipped with line-replaceable units (LRUs) including respective allocated system resources for tasks the LRUs are designed to perform, and respective unallocated system resources that are available, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for managing computing resources on a vehicle equipped with line-replaceable units (LRUs) including respective allocated system resources for tasks the LRUs are designed to perform, and respective unallocated system resources that are available, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
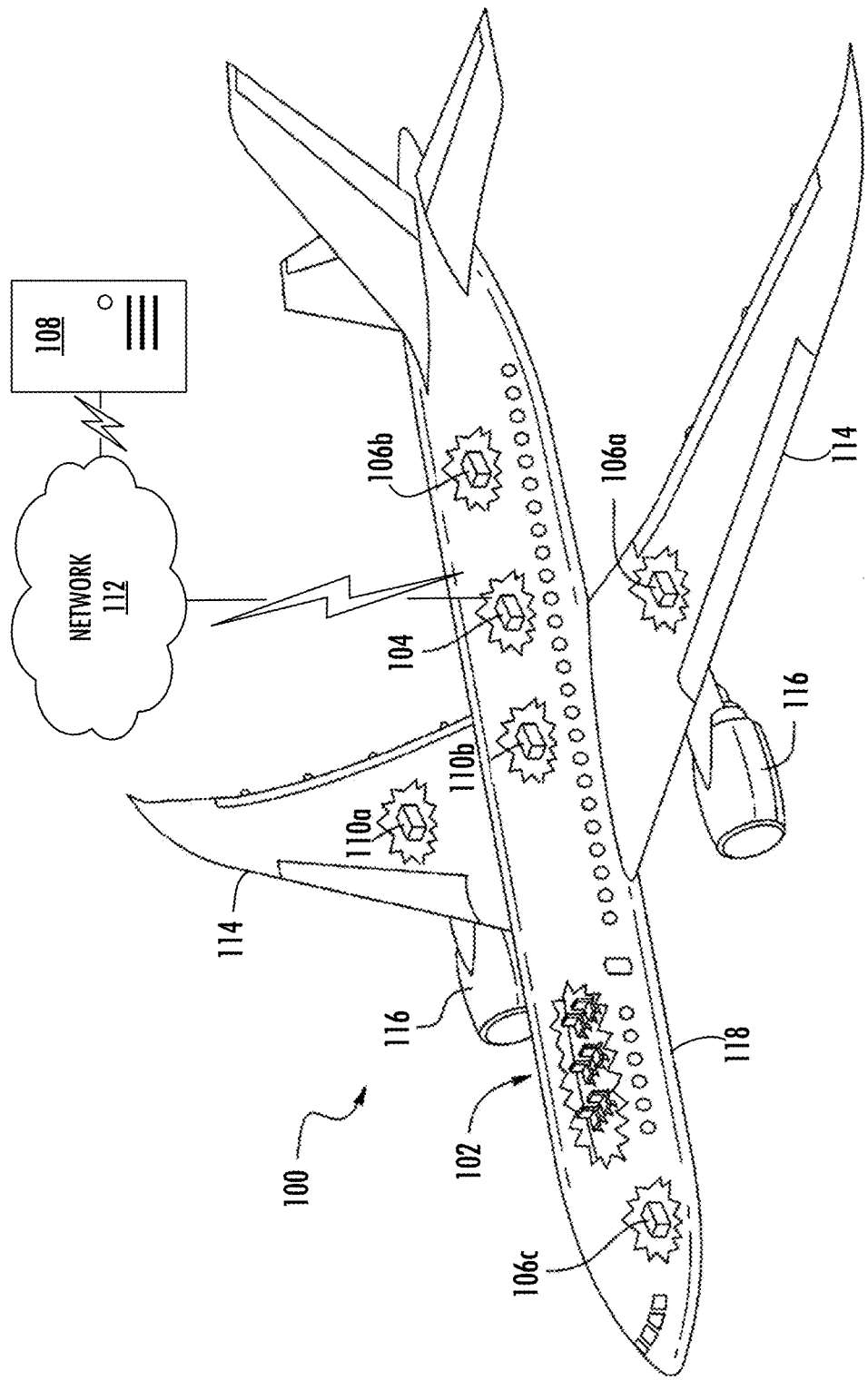
FIG. 1 illustrates a system for managing computing resources on a vehicle equipped with line-replaceable units, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are directed to efficiently distributing computing tasks across otherwise unallocated computing resources on a vehicle. Modern vehicles such as manned or unmanned land vehicles, aircraft, spacecraft, watercraft, and the like may be fitted with numerous sensors and other components that generate large volumes of data that impose a large computational burden on centralized computing resources. For example, a modern twin-engine aircraft may be fitted with five thousand sensors that generate up to 10 gigabytes of data per second. Over the course of a twelve-hour flight, those sensors may generate approximately 844 terabytes of data. These large volumes of data raise multiple technical challenges that are unmet by the conventional approaches to data processing used on vehicles. For example, off-loading the data from the vehicle to a remote computing system introduces a high latency due to the limitations of the communications links available for use with vehicles in motion, while also resulting in high CPU usage, network slow-downs, high bandwidth-consumption, and significant data storage demands. As a result, real time or near-real time analysis of the data is largely unavailable, and is otherwise limited by the processing constraints of a central server that may perform some data processing in addition to managing the flow of data off of the vehicle to one or more external systems.

To overcome these and other technical challenges, example implementations of the present disclosure leverage unallocated system resources that may be available at any of a number of line-replaceable units (LRUs) that are present on the vehicle. On a vehicle, sensors, avionic equipment, and other systems may be implemented as LRUs that include system resources that are allocated for the task or tasks that the given LRU is designed to perform. For example, an LRU associated with a sensor may include system resources allocated to read, condition, sample, or otherwise process the signal produced by the sensor. In another example, an LRU may include system resources allocated to facilitate the transmission of media or other content to the passengers. In another example, an LRU may include allocated resources to capture, record, and/or transmit avionic information.

Regardless of the precise design or purpose of a given LRU, each LRU may have additional, system resources that are unallocated during the normal operation of the LRU. For example, an LRU may have a more powerful or faster processor than necessary to handle the computational load imposed by its normal tasks, more memory than necessary to capture the required data, or may have other resources that are unallocated during its normal operation. Example implementations of the present disclosure use the unallocated system resources by applying a middleware layer from a central server to one or more LRUs to establish an edge computing infrastructure, where the LRUs are operable as edge nodes. The middleware layer then uses information about the unallocated resources, the data and data sources on the vehicle, the tasks to be performed on the data and the expected operational performance of the edge nodes to distribute tasks to the edge nodes, where the previously unallocated system resources are used to perform the assigned task or tasks.

In some example implementations, the deployment and use of a middleware layer allows for the existing system resources on a vehicle to be more efficiently used without requiring the vehicle to be fitted with additional computing resources. In some such example implementations, where no additional hardware is added to the vehicle, the middleware layer ensures that the existing system resources on the vehicle continue to perform their originally intended functions and also interact with external systems in accordance with preexisting protocols. Consequently, some example implementations of the present disclosure may be self-contained within a given vehicle, and will not require reconfiguration of external systems with which the vehicle interacts.

FIG. 1 illustrates a system 100 for managing computing resources on a vehicle equipped with LRUs, according to example implementations of the present disclosure. The system may include any of a number of different subsystems (each an individual system) for performing one or more functions or operations. As shown, in some examples, the system includes a vehicle 102, a central server 104, a plurality of LRUs 106a, 106b, and 106c, an external computing system 108, and data sources 110a and 110b. The subsystems including the central server, the LRUs, and the data sources may be co-located or directly coupled to one another, or in some examples, various ones of the subsystems may communicate with one another across one or more computer networks 110. In particular, the elements contained on the vehicle may communicate with one or more external computing systems via one or more computer networks. Further, although shown as part of the system 100, it should be understood that any one or more of the above may function or operate as a separate system without regard to any of the other subsystems. It should also be understood that the system may include one or more additional or alternative subsystems than those shown in FIG. 1.

It will be appreciated that example implementations of the present disclosure involve LRUs, data sources, and a central server that are fitted to a vehicle, including but not limited to the aircraft depicted in FIG. 1 as vehicle 102. As such, some example implementations involve a vehicle in motion, or otherwise involve situations where the ability to effectively and efficiently off-load large volumes of data to an external system is limited. For example, the relatively limited bandwidth and data transmission rates available to an aircraft while in flight, compared to the large volume of data generated during a flight, may prevent the use of analyzed sensor or avionic data in a real time or near-real time manner. It will also be appreciated that while FIG. 1 depicts a relatively limited array of LRUs for the purposes of clarity, example implementations of the present disclosure may be used with much more extensive arrays of LRUs. For example, a twin-engine aircraft may be fitted with thousands of LRUs, all or some of which may be incorporated into example implementations of the present disclosure.

As shown in FIG. 1, each of the LRUs 106a-106c and the data sources 110a and 110b is fitted in a particular position on the vehicle 102, and are communicatively coupled to the central server 104. In the example shown in FIG. 1, the LRU 106a is fitted within a wing 114, and may be designed to perform one or more tasks associated with the wing or an engine 116. The LRUs 106b and 106c are shown as being fitted in the rear and front of a cabin 118, and may each be designed to perform one or more additional tasks associated with the vehicle. As shown in FIG. 1, the data source 110a may be fitted in a wing, and the data source 110b may be fitted within the cabin, and both may generate and provide data used in connection with the operation of the vehicle. It will be appreciated that while the central server, LRUs and data sources are shown as being placed in particular locations in the vehicle, these placements are merely shown for the purposes of clarity and to identify an non-exclusive list of locations on a vehicle that the various components may be fitted on a vehicle. The central server, LRUs, and data sources may be fitted in other locations on the vehicle without departing from the scope of the present disclosure.

In addition to communicating and interacting with the various LRUs 106a-106c and data sources 110a-110b on the vehicle, the central server is configured to communicate via a computer network 112 with the external computing system 108, which is configured to receive data from the central server via the network, process such data, and, depending on the received data and the nature of the performed processing, return information to the central server. In order to improve the on-board processing of the large volumes of data generated by a vehicle (such as through the operation of the data sources and/or LRUs, for example), example implementations of the present disclosure use the central server and the various LRUs to establish a distributed edge computing infrastructure, wherein otherwise unallocated system resources at the various LRUs are assigned data and related tasks, thus leveraging the existing system resources on a vehicle to more effectively and efficiently process vehicle data.

Figure 2:
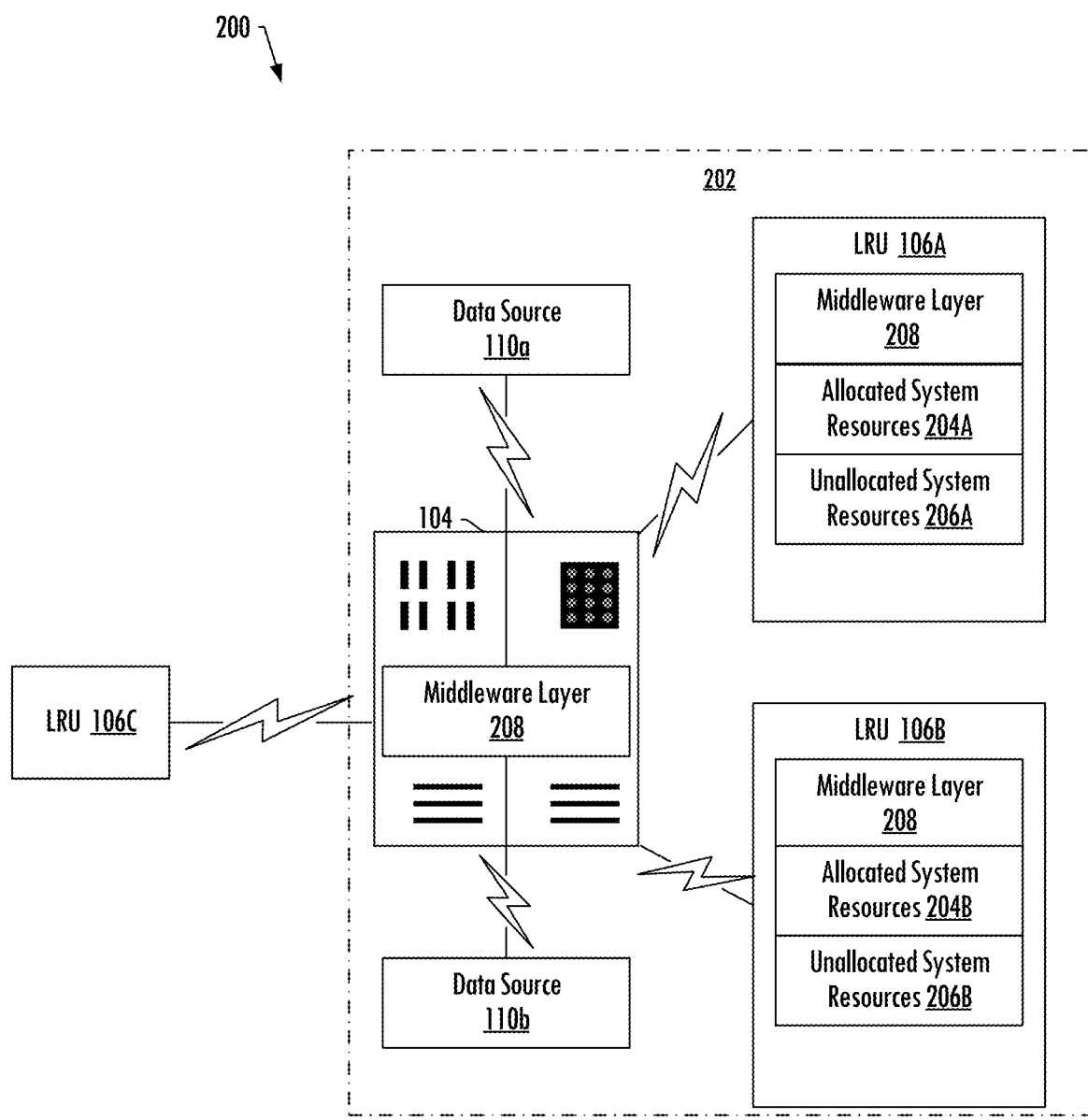
FIG. 2 illustrates an example edge computing infrastructure involving LRUs, according to example implementations of the present disclosure

FIG. 2 shows an example system 200 that includes an edge computing infrastructure 202 in accordance with the present disclosure. As shown in FIG. 2, the edge computing infrastructure includes the central server 104. The central server may be implemented as a computer or cluster of computers that are communicatively coupled to the LRUs 106a-106c, the data sources 110a and 110b and, as shown in FIG. 1, to one or more computer networks 112, through which the central server may communicate with one or more external computing systems 108. In the edge computing infrastructure established in accordance with the present disclosure, the central server also serves as a central node, which may be referred to as a master node.

As shown in FIG. 2, the example edge computing infrastructure 202 also includes the LRUs 106a and 106b. In the example shown in FIG. 2, LRU 106a is designed to perform one or more tasks, and includes circuitry and other components to perform such tasks. As such the LRU 106a includes allocated system resources 204a, such as processing power, memory, transmission capabilities, and/or other computing resources, which are dedicated or otherwise allocated to performing the task or tasks for which it was designed. For example, the LRU 106a may be designed to capture, sample, condition, and/or transmit data generated by the sensor, for example, and the allocated system resources may be allocated to such tasks. As shown in FIG. 2, the LRU 106a also includes unallocated system resources 206a, which may include processing power, memory, transmission capabilities, and/or other computing resources that are not dedicated or otherwise allocated to performing specific tasks.

As shown in FIG. 2, the example edge computing infrastructure 202 also includes the LRU 106b. Similar to the LRU 106a, the LRU 106b is designed to perform one or more tasks, and includes circuitry and other components to perform such tasks. As such the LRU 106a includes allocated system resources 204a, such as processing power, memory, transmission capabilities, and/or other computing resources, which are dedicated or otherwise allocated to performing the task or tasks for which it was designed. For example, the LRU 106b may be designed to capture, sample, condition, and/or transmit data generated by a data source, such as data source 110a or 110b for example. As shown in FIG. 2, the LRU 106b also includes unallocated system resources 206a, which may include processing power, memory, transmission capabilities, and/or other computing resources that are not dedicated or otherwise allocated to performing specific tasks.

In the example implementation depicted in FIG. 2, the data source 110a is a data source configured to provide data to the central server 104. For example, the data source 110a may be a sensor. It will be appreciated that the sensor may be any type of sensor used with the vehicle 102, including but not limited to a sensor that measures an environmental condition, fuel level, position, orientation, pressure, electrical continuity, audio, optical, and/or other condition. Regardless of the precise type or structure of the data source 110a, it includes circuitry and other components to implement the data source.

In the example implementation depicted in FIG. 2, the data source 110b is a data source configured to provide data to the central server 104. In an example implementation involving a vehicle 102 that is an aircraft, the data source 110b may be an avionic system. It will be appreciated that such an avionic system may be implemented as any avionic system appropriate for use in the vehicle in which it is incorporated. Regardless of the precise type or structure of the data source 110b, it includes circuitry and other components to implement the data source.

In the example implementation of the present disclosure shown in FIG. 2, the central server 104 identifies the various LRUs 106a-106c present on the vehicle 102. Upon identification of the LRUs, the central server may decide which LRUs to incorporate into an edge computing infrastructure 202, and which LRUs, if any, to exclude from the edge computing infrastructure. The central server then distributes a middleware layer 208 across the selected LRUs to establish the edge computing infrastructure, in which the selected LRUs are operable as edge nodes. As shown in FIG. 2, LRUs 106a and 106b are included in the edge computing infrastructure, while LRU 106c is not. In such an example implementation, the LRUs 106a and 106b will operate as edge nodes, wherein their unallocated system resources are available for use in performing one or more assigned tasks, while LRU 106c will continue to operate and interact with the central server in a conventional manner.

In the established edge computing infrastructure 202, the middleware layer 208 governs and maintains the movement of data and the assignment of related tasks among the otherwise unallocated resources in the edge computing infrastructure. The middleware receives information from the edge nodes that identifies the respective unallocated system resources. For example, the LRUs 106a and 106b will send the central server, via the middleware layer an identification of their respective unallocated resources 206a and 206b.

The middleware layer 208 also acts to the identify various data sources 110a-110b onboard the vehicle 102, which may take the form of one or more sensors, avionic systems, monitoring systems, and/or other data sources. As part of identifying the data sources, the middleware layer also identifies the data provided by the various sources and the tasks to be performed using that data. In particular, the middleware layer identifies tasks to be performed that are not the tasks that the relevant LRUs are designed to perform and for which system resources are already allocated. As such, the middleware layer identifies tasks that would conventionally either be performed by the central server 104, or off-loaded from the vehicle for processing by the external computing system 108.

Based on the identified unallocated system resources 206a-206b, the data sources 110a-110b, and the tasks to be performed, the middleware layer 208 determines the expected operational performance of the edge computing infrastructure 202. As shown in FIG. 1, and as discussed and otherwise disclosed herein, the various sensors and other data sources, as well as the various LRUs, are fitted to a vehicle 102 in fixed locations on the vehicle. As such, in some example implementations, the expected operational performance of the edge computing infrastructure is based at least in part on the transfer times necessary for data to move from one or more sources to the edge nodes. In some example implementations, the expected operational performance is based at least in part on the response times for the respective unallocated system resources of the edge nodes to perform the various needed tasks. The middleware layer then uses the expected operational performance of the edge computing infrastructure to then distribute tasks and data to the otherwise unallocated system resources. To the extent that additional tasks remain to be performed after the allocation of tasks, such task may be assigned by the middleware layer to the central server or off-loaded to an external system.

In some example implementations, the middleware layer 208 may measure the actual performance of the edge computing infrastructure, and reassign tasks based on the measured performance. In such example implementations, the middleware layer can account for deviations from the expected operational performance and changes in the level of system resources available at the various edge nodes. In addition to distributing tasks and data, the middleware layer may also distribute one or more operational policies to the edge nodes. An operational policy may reflect any rule governing the operation of the edge computing infrastructure and/or one or more nodes therein. In some example implementations, an operational policy may take the form of a timing requirement governing how quickly certain data must be processed. For example, certain sensor and/or avionics data may be required to be processed within a certain amount of time so that it can be timely displayed to a pilot and/or recorded. In other situations, the operational policy may prioritize or sequence tasks. For example, if the output of one edge node is used as an input to another edge node or other computing device, the operational policy may govern the flow of data from one location to another. In another example, the operation policy may impose protocols on communication or other interaction between edge nodes and other system components.

Figure 3:
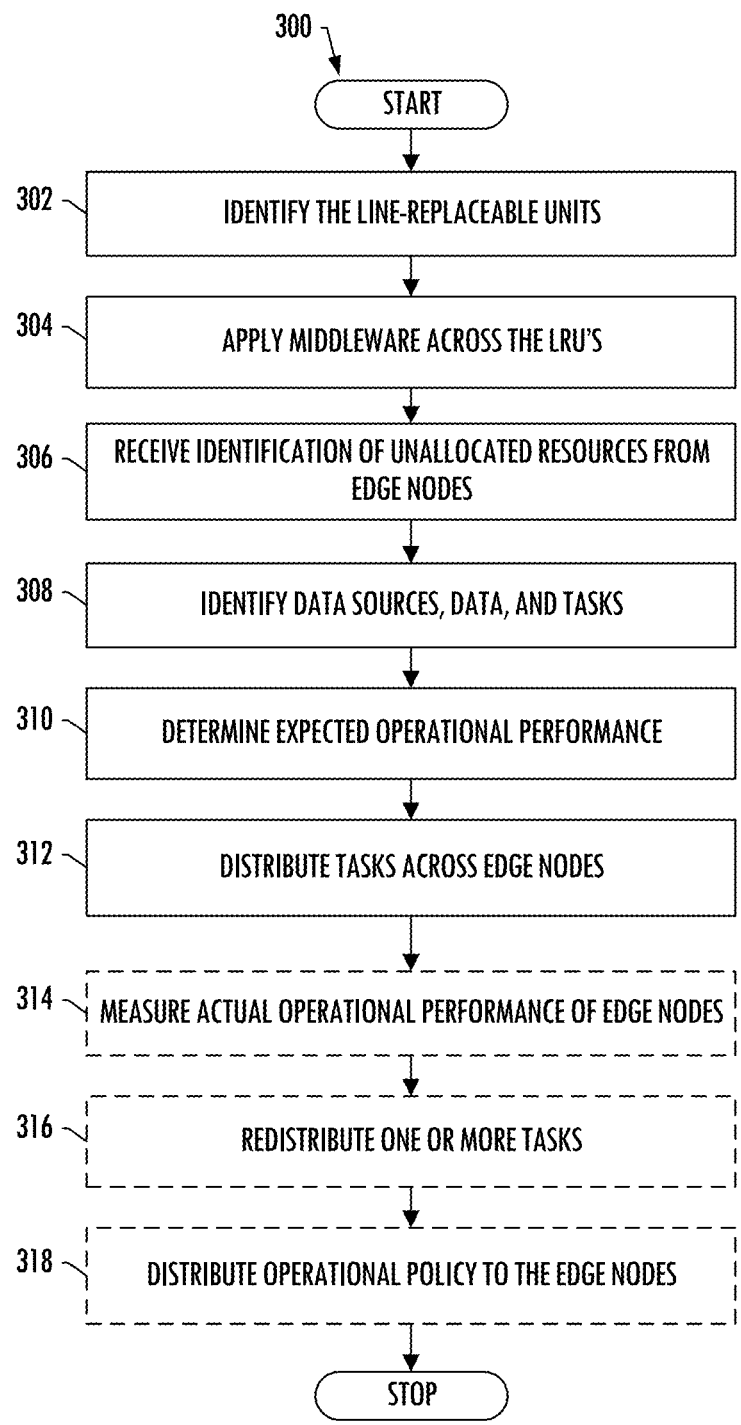
FIG. 3 is a flowchart illustrating various steps in a method for managing computing resources on a vehicle equipped with line-replaceable units, according to example implementations.

FIG. 3 is a flowchart illustrating various steps in a method 300 for managing computing resources on a vehicle 102 equipped with LRUs 106a-106c including respective allocated system resources 204a-204b for tasks the LRUs are designed to perform, and respective unallocated system resources 206a-206b that are available for use, according to example implementations of the present disclosure. As shown at block 302, the method includes identifying the LRUs. In some example implementations of block 302, a central server or other computer, such as central server 104, for example, will identify one or more LRUs that are present on the vehicle and in communication with the central computer. In some such example implementations, the central server may select one or more such identified LRUs for use in connection with the implementation of an edge node computing infrastructure.

As shown at block 304, the method 300 also includes applying middleware 208 across the LRUs. Some example implementations of block 304 involve applying a middleware layer across the LRUs 106a-106b to establish an edge computing infrastructure 202 in which the LRUs are operable as edge nodes. As discussed and otherwise disclosed herein, the deployed middleware layer is configured to allow the central server and the relevant LRUs to work in a distributed manner, such that otherwise unallocated system resources at the various LRUs can be used to process data and otherwise perform computing tasks that would otherwise be performed by the central server and/or by a remote computing system 108. As such, by using the LRUs as edge nodes, the otherwise unallocated system resources at the LRUs can be deployed to process data, perform computing tasks, and otherwise operate as a distributed edge platform to more efficiently handle the potentially high volumes of data generated by a vehicle in operation. As deployed by the central server, the middleware layer allows the central server to access, direct, and manage the generation and processing of data across the LRUs.

As shown at block 306, the method 300 also includes receiving, via the middleware layer 208, an identification of unallocated resources 206a-206b from the edge nodes, such as LRUs 106a-106b. Some example implementations of block 306 involve receiving information from the edge nodes that identifies the respective unallocated system resources. As discussed and otherwise disclosed herein, the various LRUs include system resources, such as computing resources. At least some of the system resources at a given LRU are allocated for the tasks that the LRU is designed to perform, and some of the system resources are unallocated, and available to be used to perform other tasks.

As shown at block 308, the method 300 also includes identifying data sources 110a-110b, data, and tasks. Some example implementations of block 308 involve identifying data sources onboard the vehicle 102, data provided by the data sources, and tasks to be performed using the data, the tasks to be performed excluding the tasks the LRUs are designed to perform. In some example implementations, identifying the data sources includes identifying sensors onboard the vehicle, and the data provided by the sensors includes environmental conditions measurable by the sensors. For example, one or more sensors on an aircraft may detect temperature, air speed, wind speed and/or direction, atmospheric pressure, cabin temperature, humidity, and/or other conditions. In some example implementations, such as those where the vehicle is an aircraft, identifying the sensors includes identifying avionic systems onboard the aircraft. By identifying the sources of data on the vehicle, the quantity and types of data provided by those sources, and the relevant tasks to be performed on the data, the central server 104, via the middleware layer 208, can determine how to assign tasks and direct data among the otherwise unallocated system resources 206a-206b available at the various LRUs 106a-106b.

As shown at block 310, the method 300 also includes determining an expected operational performance. Some example implementations of block 310 involve determining expected operations performance of the edge computing infrastructure 202 based on the respective unallocated system resources 206a-206b, the data sources 110a-110b, the data provided by those sources, and the tasks to be performed and that data. In some example implementations, determining the expected operational performance of the edge node computing infrastructure comprises determining transfer times of the data from the data sources to the edge nodes (such as LRUs 106a-106b). As discussed and otherwise disclosed herein, the various LRUs on a vehicle 102 may be disposed in any of a number of physical positions on a given vehicle, and thus may be spaced some distance away from a data source that provides data used in a given task, and may be spaced some distance away from the central server and/or another LRU or other component to which a given LRU may provide the result of a given task. Such distances and the time needed for the relevant data to be transferred across one or more of such distances can be a factor in the operational performance of an edge node, particularly in situations where timing constraints (such as those involved with real time or near real time requirements, for example) are imposed on one or more computing tasks.

In some example implementations of block 310, determining the expected operational performance of the edge computing infrastructure 202 comprises determining response times of the respective unallocated system resources 206a-206b of the edge nodes (such as LRUs 106a-106b) to perform the tasks using the data. As described or otherwise disclosed herein, the characteristics of the unallocated system resources may vary among the various LRUs. For example, one LRU may be equipped with a faster processor or more memory than another LRU. In another example, the tasks that one LRU is designed to perform may impose a smaller computational load the LRU than the tasks associated with another LRU. In some example implementations, determining the response times of the respective unallocated system resources of the edge nodes to perform the task using the data includes determining the time necessary for the unallocated resources at a given LRU to perform one or more tasks or portions of tasks. By determining the response time of the unallocated system resources, the central server, via the middleware layer, can determine how the unallocated system resources are expected to perform if assigned a given task and the data associated with that task, and factor the expected performance into a determination of how to distribute data sets and tasks (or portions thereof) to the various unallocated resources at the edge nodes.

As shown at block 312, the method 300 also includes distributing tasks across edge nodes (such as LRUs 106a-106b). Some example implementations of block 312 involve distributing the tasks to be performed across the edge nodes at which at least a portion the respective, previously unallocated system resources are allocated to the tasks, based on the expected operational performance of the edge computing infrastructure, the portion of the respective unallocated system resources thereby constituting respective allocated system resources for the tasks to be performed. In some example implementations, the central server 104, via the middleware layer 208, uses the determined expected operational performance of the individual edge nodes and the overall edge node computing infrastructure 202 to determine which tasks should be assigned and distributed to which edge nodes. The expected operational performance can be used to identify which nodes are capable of handling the additional tasks beyond those that the LRU was designed to perform within any relevant timing or other operational performance requirements. Upon distribution of the tasks to the various edge nodes, the previously unallocated system resources are allocated to perform the distributed tasks, and the middleware layer allows for the management of the resources on the LRU, the distribution of data to the relevant LRU, and the transmission of the results of the tasks to the appropriate system component or other location.

Some example implementations of the method 300 may include additional aspects. As shown in block 314, some example implementations of the method include measuring the actual operational performance of the edge nodes. Some example implementations of block 314 involve, via the middleware layer 208, measuring an actual operational performance of the edge node computing infrastructure as the tasks to be performed are performed. In some such example implementations, the central server, via the middleware, monitors the performance of the edge node computing infrastructure while in operation. In some instances, the performance of the edge node computing infrastructure may be measured as a whole, and the operational performance of one or more individual edge nodes may also be evaluated. In situations where there are specifications, metrics, and/or other requirements associated with one or more tasks (such as time limits or other requirements for the processing and transmission of data, computational speed, processing throughput, or the like, for example), the measured performance can be checked against such requirements.

As shown in block 316, some example implementations of the method 300 include redistributing one or more tasks. Some example implementations of block 316 involve, via the middleware 208, redistributing one or more of the tasks to be performed across the edge nodes based on the actual operational performance of the edge node computing infrastructure 202. Since some example implementations arise in situations involving a moving vehicle 102, the quantity of data to be processed, and the tasks to be performed, may change over time or be otherwise dynamic, such that a task distribution made at one point in time may be inefficient or inappropriate at another point in time. Moreover, changes in the quantity of data and/or the tasks to be performed may result in the system resources at a given edge node becoming overwhelmed or, conversely, underutilized, depending on the scope and nature of the change. It is also possible, in some situations, that the actual operational performance of the edge computing infrastructure may differ from the expected operational performance. As such, example implementations of block 316, allow for the redistribution of one or more tasks across edge nodes based on the measured, actual performance of the edge node computing infrastructure.

As shown in block 318, some example implementations of the method 300 include distributing an operational policy to the edge nodes. Some example implementations of block 318 involve, via the middleware 208, distributing an operational policy of the edge computing infrastructure to the edge nodes, the operational policy setting a condition or constraint on the performance of the tasks to be performed. It will be appreciated that an operational policy may be dependent upon the situation in which it is implemented. An operational policy may take the form of a timing requirement governing how quickly certain data must be processed. For example, certain sensor and/or avionics data may be required to be processed within a certain amount of time so that it can be timely displayed to a pilot and/or recorded. In other situations, the operational policy may prioritize or sequence tasks. For example, if the output of one edge node is used as an input to another edge node or other computing device, the operational policy may govern the flow of data from one location to another. In another example, the operation policy may impose protocols on communication or other interaction between edge nodes and other system components. As described and otherwise disclosed herein, some example implementations of the present disclosure arise in situations where a vehicle interacts with one or more external systems, either directly or via one or more networks. In some such situations, an operational policy may be applied to the edge nodes such that the communication between system resources on the vehicle and such external systems follows the expected communication protocols associated with the external systems and/or the external networks.

According to example implementations of the present disclosure, the system 100 and its subsystems including the central server 104 and the LRUs 106a, 106b, and 106c, may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
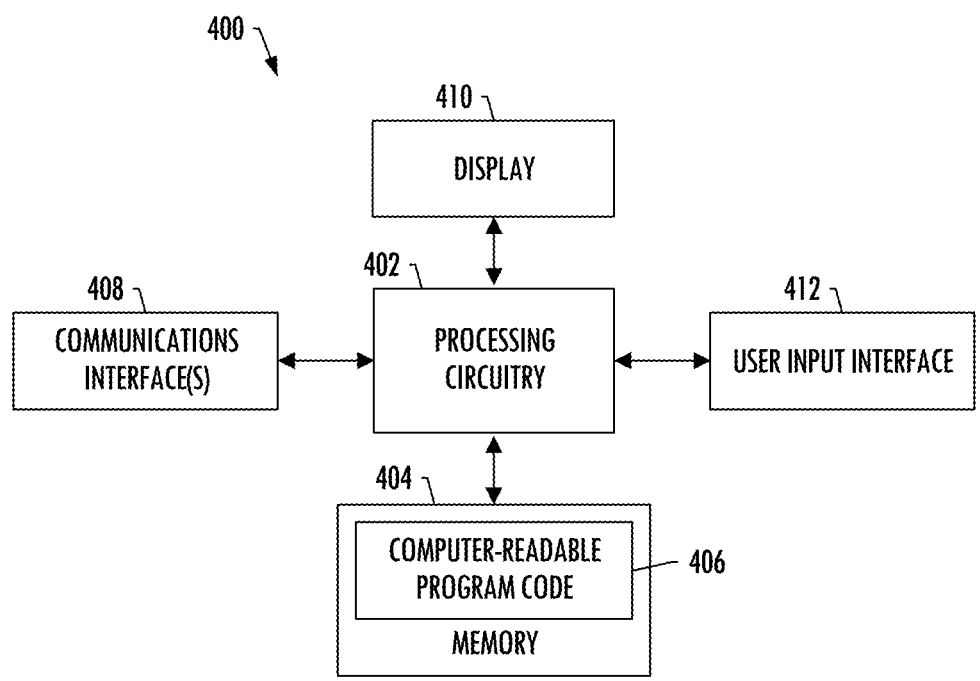
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for managing computing resources on a vehicle equipped with line-replaceable units (LRUs) including respective allocated system resources for tasks the LRUs are designed to perform, and respective unallocated system resources that are available, the method comprising:
   identifying the LRUs;
   applying a middleware layer across the LRUs to establish an edge computing infrastructure in which the LRUs are operable as edge nodes; and via the middleware layer,
   receiving information from the edge nodes that identifies the respective unallocated system resources;
   identifying data sources onboard the vehicle, data provided by the data sources, and tasks to be performed using the data, the tasks to be performed excluding the tasks the LRUs are designed to perform;
   determining expected operational performance of the edge computing infrastructure based on the respective unallocated system resources, the data sources, the data, and the tasks to be performed; and
   distributing the tasks to be performed across the edge nodes at which at least a portion of the respective unallocated system resources are allocated to the tasks, based on the expected operational performance of the edge computing infrastructure, the portion of the respective unallocated system resources thereby constituting respective allocated system resources for the tasks to be performed.

2. The method of claim 1, wherein identifying the data sources includes identifying sensors onboard the vehicle, and the data provided by the sensors includes environmental conditions measurable by the sensors.

3. The method of claim 2, wherein the vehicle is an aircraft, and identifying the sensors includes identifying avionic systems onboard the aircraft.

4. The method of claim 1, wherein determining the expected operational performance of the edge computing infrastructure comprises determining transfer times of the data from the data sources to the edge nodes.

5. The method of claim 1, wherein determining the expected operational performance of the edge computing infrastructure comprises determining response times of the respective unallocated system resources of the edge nodes to perform the tasks using the data.

6. The method of claim 1, further comprising via the middleware layer:
   measuring an actual operational performance of the edge computing infrastructure as the tasks to be performed are performed; and
   redistributing one or more of the tasks to be performed across the edge nodes based on the actual operational performance of the edge computing infrastructure.

7. The method of claim 1, further comprising, via the middleware layer, distributing an operational policy of the edge computing infrastructure to the edge nodes, the operational policy setting a condition or constraint on performance of the tasks to be performed.

8. An apparatus for managing computing resources on a vehicle equipped with line-replaceable units (LRUs) including respective allocated system resources for tasks the LRUs are designed to perform, and respective unallocated system resources that are available, the apparatus comprising:
   a memory configured to store computer-readable program code; and
   processing circuitry configured to access the memory and execute the computer-readable program code to cause the apparatus to at least:
   identify the LRUs;
   apply a middleware layer across the LRUs to establish an edge computing infrastructure in which the LRUs are operable as edge nodes; and via the middleware layer,
   receive information from the edge nodes that identifies the respective unallocated system resources;
   identify data sources onboard the vehicle, data provided by the data sources, and tasks to be performed using the data, the tasks to be performed excluding the tasks the LRUs are designed to perform;
   determine expected operational performance of the edge computing infrastructure based on the respective unallocated system resources, the data sources, the data, and the tasks to be performed; and
   distribute the tasks to be performed across the edge nodes at which at least a portion of the respective unallocated system resources are allocated to the tasks, based on the expected operational performance of the edge computing infrastructure, the portion of the respective unallocated system resources thereby constituting respective allocated system resources for the tasks to be performed.

9. The apparatus of claim 8, wherein identifying the data sources includes identifying sensors onboard the vehicle, and the data provided by the sensors includes environmental conditions measurable by the sensors.

10. The apparatus of claim 9, wherein the vehicle is an aircraft, and identifying the sensors includes identifying avionic systems onboard the aircraft.

11. The apparatus of claim 8, wherein determining the expected operational performance of the edge computing infrastructure comprises determining transfer times of the data from the data sources to the edge nodes.

12. The apparatus of claim 8, wherein determining the expected operational performance of the edge computing infrastructure comprises determining response times of the respective unallocated system resources of the edge nodes to perform the tasks using the data.

13. The apparatus of claim 8, wherein the processing circuitry is configured to execute the computer-readable program code to cause the apparatus to further at least, via the middleware layer:
   measure an actual operational performance of the edge computing infrastructure as the tasks to be performed are performed; and
   redistribute one or more of the tasks to be performed across the edge nodes based on the actual operational performance of the edge computing infrastructure.

14. The apparatus of claim 8, wherein the processing circuitry is configured to execute the computer-readable program code to cause the apparatus to further at least, via the middleware layer, distribute an operational policy of the edge computing infrastructure to the edge nodes, the operational policy setting a condition or constraint on performance of the tasks to be performed.

15. A computer-readable storage medium for managing computing resources on a vehicle equipped with line-replaceable units (LRUs) including respective allocated system resources for tasks the LRUs are designed to perform, and respective unallocated system resources that are available, the computer-readable storage medium being non-transitory and having computer-readable program code stored therein that, in response to execution by processing circuitry, causes an apparatus to at least:
   identify the LRUs;
   apply a middleware layer across the LRUs to establish an edge computing infrastructure in which the LRUs are operable as edge nodes; and via the middleware layer,
   receive information from the edge nodes that identifies the respective unallocated system resources;
   identify data sources onboard the vehicle, data provided by the data sources, and tasks to be performed using the data, the tasks to be performed excluding the tasks the LRUs are designed to perform;
   determine expected operational performance of the edge computing infrastructure based on the respective unallocated system resources, the data sources, the data, and the tasks to be performed; and
   distribute the tasks to be performed across the edge nodes at which at least a portion of the respective unallocated system resources are allocated to the tasks, based on the expected operational performance of the edge computing infrastructure, the portion of the respective unallocated system resources thereby constituting respective allocated system resources for the tasks to be performed.

16. The computer-readable storage medium of claim 15, wherein identifying the data sources includes identifying sensors onboard the vehicle, and the data provided by the sensors includes environmental conditions measurable by the sensors.

17. The computer-readable storage medium of claim 16, wherein the vehicle is an aircraft, and identifying the sensors includes identifying avionic systems onboard the aircraft.

18. The computer-readable storage medium of claim 15, wherein determining the expected operational performance of the edge computing infrastructure comprises determining transfer times of the data from the data sources to the edge nodes.

19. The computer-readable storage medium of claim 15, wherein determining the expected operational performance of the edge computing infrastructure comprises determining response times of the respective unallocated system resources of the edge nodes to perform the tasks using the data.

20. The computer-readable storage medium of claim 15, wherein the computer-readable storage medium has further computer-readable program code stored therein that, in response to execution by the processing circuitry, causes the apparatus to further at least, via the middleware layer:
   measure an actual operational performance of the edge computing infrastructure as the tasks to be performed are performed; and
   redistribute one or more of the tasks to be performed across the edge nodes based on the actual operational performance of the edge computing infrastructure.

21. The computer-readable storage medium of claim 15, wherein the computer-readable storage medium has further computer-readable program code stored therein that, in response to execution by the processing circuitry, causes the apparatus to further at least, via the middleware layer, distribute an operational policy of the edge computing infrastructure to the edge nodes, the operational policy setting a condition or constraint on performance of the tasks to be performed.

* * * * *